United States Patent Office 3,071,602
Patented Jan. 1, 1963

3,071,602
5α-FLUORO ANDROSTANES
Albert Bowers, Mexico City, Mexico, assignor, by mesne assignments, to Syntex Corporation, a corporation of Panama
No Drawing. Filed Mar. 24, 1961, Ser. No. 98,019
21 Claims. (Cl. 260—397.3)

The present invention relates to novel cyclopentanophenanthrene derivatives and to a novel process for the production thereof.

More particularly the present invention relates to novel 5α-fluoro steroids and more specifically to 5α-fluoro steroids of the androstane, 19-nor-androstane and allopregnane series.

The novel compounds of the present invention which are active hormones of the androgenic type exhibiting anabolic, anti-estrogenic and anti-gonadotrophic activities as well as stimulate ovulation, reduce pre-menstrual tension, lower blood cholesterol levels and also useful in the treatment of hirsutism are represented by the following formulas:

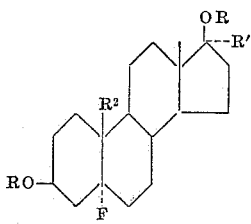
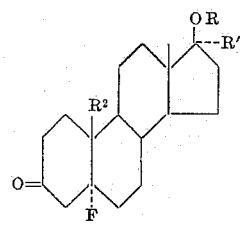

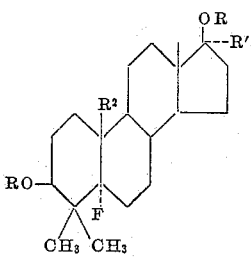
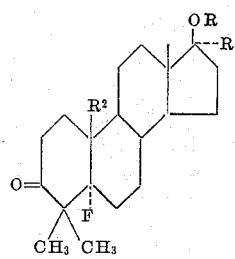

In the above formulas R represents hydrogen or the acyl radical of a hydrocarbon carboxylic acid of less than 12 carbon atoms, saturated or unsaturated, of straight, branched, cyclic or mixed cyclic-aliphatic chain, substituted or not with alkoxy, acyloxy, halogen or other groups. Typical ester groups are the acetate, propionate, butyrate, hemisuccinate, enanthate, caproate, benzoate, dodecanoate, trimethylacetate, phenoxyacetate, cyclopentylpropionate, phenylpropionate and β-chloropropionate. R' represents hydrogen or an aliphatic hydrocarbon radical containing up to eight carbon atoms such as methyl, ethyl, propyl, ethinyl, butenyl, propinyl, propenyl and vinyl, and $R^2$ represents hydrogen or methyl.

The novel compounds of the present invention which are progestational agents exhibiting anti-estrogenic and anti-gonadotrophic activities as well as lower the blood cholesterol are represented by the following formulas:

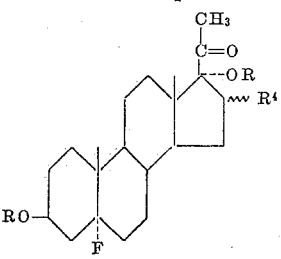
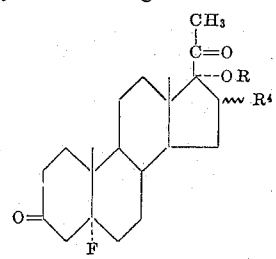

In the above formulas R has the same meaning as previously set forth; $R^4$ represents hydrogen or a methyl group in α or β configuration.

The novel compounds of the present invention which exhibit cortisone-like activities in addition to anti-estrogenic and anti-gonadotrophic activities are represented by the following formulas:

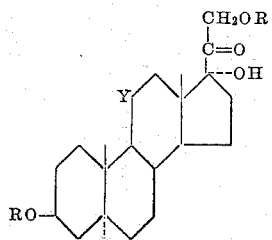
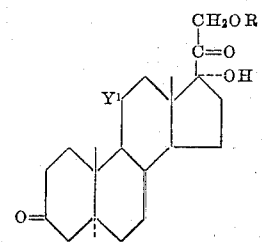

In the above formulas R has the same meaning as previously set forth; Y represents hydrogen, keto, α or β-hydroxy; $Y^1$ represents hydrogen or keto.

In addition to the properties set forth above, all of the 3-keto-5α-fluoro compounds also exhibit hypertensive activity and possess anti-fungal properties.

The novel 5α-fluoro compounds are prepared by a process exemplified by the following equation insofar as rings A and B are concerned.

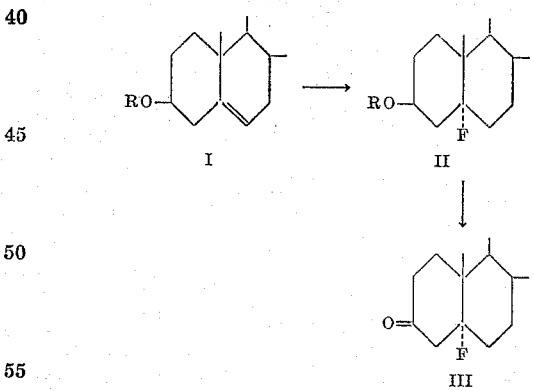

In the above formulas R has the same meaning as previously set forth. In practicing the process outlined above, a 3β-hydroxy or 3β-acyloxy-Δ⁵-steroid dissolved in an anhydrous inert solvent such as methylene dichloride, chloroform, carbon tetrachloride, ether, or the like, is added to a mixture of anhydrous hydrogen fluoride and anhydrous tetrahydrofuran at low temperature, between −80° and 0° C., preferably at about −50° C., to form the 3β-hydroxy or 3β-acyloxy-5α-fluoro steroid (II). The latter compound is then saponified as by treatment with dilute methanolic potassium hydroxide, to afford the free alcohol. Upon conventional oxidation, preferably with 8 N chromic acid, there is obtained the corresponding 3-keto-5α-fluoro steroid (III).

Typical starting materials which can be employed for the process outlined above include among others, Δ⁵-androstene-3β,17β-diol-17-acetate,
17α-methyl-Δ⁵-androstene-3β,17β-diol,
4,4-dimethyl-Δ⁵-androstene-3β,17β-diol,
4,4,17α-trimethyl-19-nor-Δ⁵-androsten-17β-ol,
Δ⁵-pregnene-3β,17α-diol-20-one-3,17-diacetate,
Δ⁵-pregnene-3β,17α,21-triol-11,20-dione 21 acetate,
17α-ethinyl-Δ⁵-androstene-3β,17β-diol,
17α-methyl-19-nor-Δ⁵-androstene-3β,17β-ol,
17α-vinyl-19-nor-Δ⁵-androsten-17β-ol.

There are thus prepared

5α-fluoro-androstane-3β,17β-diol-17-acetate,
17α-methyl-5α-fluoro-androstane-3β,17β-diol,
4,4-dimethyl-5α-fluoro-androstane-3β,17β-diol,
4,4,17α-trimethyl-5α-fluoro-19-nor-androstane-3β,17β-ol,
5α-fluoro-pregnane-3β,17α,21-triol-20-dione 21 acetate,
17α-ethinyl-5α-fluoro-androstane-3β,17β-diol,
17α-methyl-5α-fluoro-19-nor-androstane-3β,17β-diol,
17α-vinyl-5α-fluoro-19-nor-androstane-3β,17β-diol and the corresponding 3-keto derivatives.

There are also contemplated within the scope of the invention the 5α-fluoro pregnane derivatives containing a methyl group (α or β) at C–16.

The following examples serve to illustrate but are not intended to limit the scope of the invention:

Example I

A solution of 5 g. of Δ⁵-pregnen-3β-ol-20-one in 150 cc. of anhydrous methylene chloride was cooled to 0° C. and added to a mixture of 25 g. of hydrogen fluoride and 44 g. of anhydrous tetrahydrofuran that was previously cooled in a Dry Ice acetone bath to −80° C. After 6 hours at approximately −50°, the reaction mixture was neutralized by careful addition of ice cold sodium carbonate solution, the organic layer was separated and the aqueous layer extracted with methylene chloride. The combined extracts were then washed to neutral, dried over anhydrous sodium sulfate and evaporated to dryness. Chromatography of the residue on neutral alumina furnished 5α-fluoro-pregnan-3β-ol-20-one, M.P. 188–189°; [α]_D+109° (chloroform).

An ice-cold solution of 3 g. of the foregoing compound in 150 ml. of acetone was treated with an excess of 8 N chromic acid, with stirring. The 8 N chromic acid was prepared in aqueous dilute sulfuric acid. The temperature was maintained at 0° C. during the addition. Stirring was then continued for 2 minutes, addition of ice-water gave a precipitate which was water-washed, dried and cyrstallized from acetone-hexane to afford 5α-fluoro-pregnan-3,20-dione, M.P. 204–205° [α]_D+100° (chloroform).

Example II

A solution of 5 g. of Δ⁵-pregnen-3β,17α-diol-20-one diacetate in 200 cc. of pure chloroform was treated with anhydrous hydrogen fluoride in tetrahydrofuran, in accordance with the method of the preceding example, to produce 5α-fluoro-pregnane-3β,17α-diol-20-one diacetate.

3 g. of the foregoing compound was treated with 100 cc. of 1% methanolic potassium hydroxide, under an atmosphere of nitrogen, and the mixture was kept at 0° C. for 1 hour; it was then neutralized with acetic acid and the volume was reduced to about 20 cc. under vacuo. Water was added, the precipitate collected by filtration, water-washed, dried and crystallized from acetone. Thus 5α-fluoro-pregnan-3β,17α-diol-20-one 17-acetate was obtained.

Oxidation of the above compound with 8 N chromic acid in acetone solution gave 5α-fluoro-pregnan-17α-ol-3,20-dione acetate.

Example III

By application of the reactions described in Example I, from 16β-methyl-Δ⁵-pregnen-3β-ol-20-one were obtained, consecutively: 16β-methyl-5α-fluoro-pregnan-3β-ol-20-one and 16β-methyl-5α-fluoro-pregnane-3,20-dione.

In a similar manner, 16α-methyl-Δ⁵-pregnen-3β-ol-20-one was converted into 5α-fluoro-16α-methyl-pregnan-3β-ol-20-one and 5α-fluoro-16α-methyl-pregnane-3,20-dione.

Example IV

A mixture of 1 g. of Δ⁵-pregnene-3β,17α-diol-20-one (Ringold et al., J. Am. Chem. Soc., 78, 820 (1956)), 50 ml. of dry benzene, 5 ml. of propionic anhydride and 0.5 g. of p-toluenesulfonic acid monohydrate was left at room temperature overnight, then water-washed, dried over anhydrous sodium sulfate and evaporated to dryness. The residue was treated with 50 ml. of 1% methanolic potassium hydroxide, under an atmosphere of nitrogen at 5° for 2 hours. After acidifying with acetic acid, the volume was reduced to about 20 ml. in vacuo. Water was then added, the precipitate collected by filtration, water-washed, dried and crystallized from acetone-hexane. Thus Δ⁵-pregnene-3β,17α-diol-20-one 17-propionate was obtained which in its turn, was submitted to the reaction with hydrogen fluoride described in Example I, followed by chromium trioxide oxidation. There were produced consecutively: 5α-fluoro-pregnane-3β,17α-diol-20-one 17-propionate and 5α-fluoro-pregnan-17α-ol-3,20-dione propionate.

Example V

To a mixture of 10 g. of anhydrous hydrogen fluoride and 17.6 cc. of dry tetrahydrofuran previously cooled to −50° C. there was added a cold solution of 2 g. of Δ⁵-pregnene-3β,17α-diol-20-one in 50 cc. of carbon tetrachloride and the mixture kept at 0° C. for 4 hours; the product was isolated by neutralizing the reaction mixture with ice-cold 10% sodium carbonate solution and extraction with methylene chloride. Chromatography of the residue on neutral alumina gave 5α-fluoro-pregnan-3β,17α-diol-20-one.

Upon oxidation of the above compound with 8 N chromium trioxide in acetone solution there was obtained 5α-fluoro-pregnan-17α-ol-3,20-dione.

Example VI

To a solution of 10 g. of 16-methyl-Δ⁵,¹⁶-pregnadien-3β-ol-20-one (Romo et al., Bol. Inst. Quim. Mex., 4, 125 (1952)), in 700 ml. of methanol were added 20 ml. of 4 N aqueous sodium hydroxide and then 40 ml. of 30% hydrogen peroxide, while stirring and maintaining the temperature below 15° C. The mixture was left in the refrigerator overnight, then poured into ice-water, the product collected by filtration, water-washed and dried, affording 16-methyl-16α,17α-oxido-Δ⁵-pregnen-3β-ol-20-one. 10 g. of this compound were suspended in 100 ml. of methylene chloride, the suspension was chilled to 10° C. and 10 ml. of acetic acid, saturated with dry hydrogen bromide, were added, little by little, while stirring and at 15° C. The mixture was then stirred at room temperature for half an hour, at the end of this time it was diluted with ice-water, the organic layer was separated, water-washed, dried over anhydrous sodium sulfate and evaporated to dryness under reduced pressure. 5 g. of the thus obtained bromohydrin were then refluxed with 10 g. of Raney nickel and 150 ml. of methanol under an atmosphere of nitrogen for 4 hours. At the end of this time, the solid was filtered and the filtrate was concentrated to the point of crystallization. After cooling, the product was collected by filtration, water-washed, dried and chromatographed on silica gel furnishing 16α-methyl-Δ⁵-pregnene-3β,17α-diol-20-one.

The above compound was treated with hydrogen fluoride in tetrahydrofuran solution and then oxidized with 8 N chromic acid, by following the method of Example I, thus giving 5α-fluoro-16α-methyl-pregnane-3β,17α-diol-20-one and 5α-fluoro-16α-methyl-pregnan-17α-ol-3,20-dione.

Example VII 5 g. of Δ⁵-pregnene-3β,17α-diol-11,20-dione, described by Rothman and Wall in J. Am. Chem. Soc. 81, 411

(1959), was acetoxylated at C-21 by the method of Ringold et al. described in J. Am. Chem. Soc., 80, 250 (1958), thus giving Δ⁵-pregnene-3β,17α,21-triol-11,20-dione 21-acetate.

A solution of 2 g. of Δ⁵-pregnen-3β,17α,21-triol-11,20-dione 21-acetate in 200 cc. of anhydrous tetrahydrofuran was added to a mixture of 10 g. of hydrogen fluoride and 17.6 g. of anhydrous tetrahydrofuran (previously cooled to −80° C. in a Dry Ice-acetone bath). The mixture was kept for one hour at −50° C. and then poured carefully over an ice cold solution of 20 g. of sodium carbonate in 1 liter of water, the product extracted with methylene chloride and the organic solution washed to neutral, dried and evaporated to dryness. Chromatography of the residue gave 5α-fluoro-pregnan-3β,17α,21-triol-11,20-dione 21-acetate which upon chromium trioxide oxidation gave 5α-fluoro-pregnan-17α,21-diol-3,11,20-trione 21-acetate.

A stirred suspension of 500 mg. of the above compound in 10 cc. of methanol was treated at 0° C. and under nitrogen atmosphere with 5 cc. of 1% methanolic potassium hydroxide solution, and the mixture stirred for 1 hour at 0° C. The resulting solution was neutralized with acetic acid, diluted with water and the crystalline product collected by filtration. There was thus obtained 5α-fluoro-pregnane-17α,21-diol-3,11,20-trione.

*Example VIII*

Δ⁵-pregnene-3β,17α,21-triol-20-one, described by Fuchs and Reinstein in Helv. Ch. Acta, 24, 401 (1941), was acetylated selectively at C-21 by treatment with 1.1 molar equivalents of acetic anhydride in pyridine solution overnight at 0° C., and the resulting 21-monoacetate was treated with hydrogen fluoride in methylene chloride solution by following the method of Example I, to produce 5α-fluoro-pregnane-3β,17α,21-triol-20-one 21-acetate. Upon oxidation of the above compound with 8 N chromic acid there was obtained 5α-fluoro-pregnane-17α,21-diol-3,20-dione 21-acetate.

*Example IX*

A mixture of 500 mg. of 5α-fluoro-pregnane-17α,21-diol-3,11,20-trione, obtained as described in Example VII, 3 cc. of pyridine and 0.5 cc. of cyclopentylpropionic anhydride was kept at room temperature overnight, poured into water and the formed precipitate collected by filtration, washed with water and dried. There was thus obtained 5α-fluoro-pregnane-17α,21-diol-3,11,20-trione 21-cyclopentylpropionate.

By the same method, but using propionic, caproic and undecenoic anhydrides there were produced the corresponding 21-esters of 5α-fluoro-pregnane-17α,21-diol-3,11,20-trione.

*Example X*

A solution of 250 mg. of 5α-fluoro-pregnan-3β,17α,21-triol-20-one 21-monoacetate in 1 cc. of pyridine was treated with 0.3 cc. of propionic anhydride and the mixture kept overnight at room temperature. There was thus produced 5α-fluoro-pregnan-3β,17α,21-triol-20-one 3-propionate 21-acetate.

*Example XI*

A solution of 3 g. of Δ⁵-pregnene-3β,11α,17α-triol-20-one described by Halpern et al. in J. Am. Chem. Soc. 81, 439 (1959), in 12 cc. of pyridine was treated with propionic anhydride in the presence of p-toluenesulfonic acid, in accordance with the method of Example III, to afford the corresponding tripropionate.

The above compound was then dissolved in 200 cc. of methylene chloride and treated at −50° C. with a mixture of hydrogen fluoride and tetrahydrofuran in accordance with the method of Example I to produce 5α-fluoro-pregnan-3β,11α,17α-triol-20-one tripropionate.

1.5 g. of the above compound were treated with 150 cc. of 1% methanolic potassium hydroxide solution and the mixture kept at room temperature, under nitrogen atmosphere, for 1 hour. The resulting solution was neutralized with acetic acid and concentrated to a small volume under reduced pressure; it was then diluted with water and the precipitate filtered, washed with water and air dried. Crystallization from acetone-hexane gave 5α-fluoro-pregnane-3β,11α,17α-triol-20-one 17-propionate.

The foregoing compound was treated with an 8 N chromic acid solution in acetone, by following the method of Example I, to yield 5α-fluoro-pregnan-17α-ol-3,11,20-trione propionate.

*Example XII*

A solution of 10 g. of Δ⁵-androstene-3β,17β-diol 17-monobenzoate in 150 cc. of methylene chloride was cooled to −50° C. and added to a cooled mixture of 20 g. of hydrogen fluoride and 35.2 g. of dry tetrahydrofuran. The mixture was kept at −50° C. for 12 hours and then treated with sodium carbonate solution, by following the method of Example I. There was thus obtained 5α-fluoro-androstane-3β,17β-diol 17-monobenzoate. Upon chromium trioxide oxidation of the above compound there was produced 5α-fluoro-androstan-17β-ol-3-one benzoate.

A solution of 5 g. of the latter compound in 250 cc. of methanol and 2.5 g. of potassium hydroxide was kept at room temperature under a nitrogen atmosphere for 24 hours, it was then poured into water and the formed precipitate collected by filtration, washed with water and air dried. Crystallization from chloroform methanol gave 5α-fluoro-androstan-17β-ol-3-one.

A mixture of 1 g. of the above compound, 5 cc. of pyridine and 5 cc. of acetic anhydride was kept at room temperature overnight, poured into water and the precipitate collected by filtration, washed with water and dried, thus giving 5α-fluoro-androstan-17β-ol-3-one acetate.

By the same method, but using propionic, caproic and cyclopentylpropionic anhydrides as esterifying agents there were produced the corresponding esters of 5α-fluoro-androstan-17β-ol-3-one.

*Example XIII*

Example I was repeated, but using 17α-methyl-Δ⁵-androstene-3β,17β-diol and 17α-ethinyl-Δ⁵-androstene-3β,17β-diol as starting materials. There were thus produced 5α-fluoro-17α-methyl-androstan-3β,17β-diol, 5α-fluoro-17α-methyl-androstan-17β-ol-3-one, 5α-fluoro-17α-ethinyl-androstane-3β,17β-diol and 5α-fluoro-17α-ethinyl-androstan-17β-ol-3-one.

*Example XIV*

A solution of 1 g. of 5α-fluoro-17α-ethinyl-androstan-17β-ol-3-one in 50 cc. of benzene was treated with 5 cc. of acetic anhydride and 250 mg. of p-toluenesulfonic acid and the mixture kept at room temperature for 24 hours, it was then diluted with water, stirred for 30 minutes to hydrolyze the excess of anhydride, the benzene layer separated and washed to neutral, dried over anhydrous sodium sulfate and evaporated to dryness under reduced pressure. After chromatography of the residue on neutral alumina there was obtained 5α-fluoro-17α-ethinyl-androstan-17β-ol-3-one acetate.

*Example XV*

By following the method of Example I, Δ⁵-androstene-3β,17β-diol and 17α-ethyl-Δ⁵-androstene-3β,17β-diol were treated with a mixture of hydrogen fluoride and tetrahydrofuran to produce 5α-fluoro-androstane-3β,17β-diol and 5α-fluoro-17α-ethyl-androstane-3β,17β-diol respectively.

Treatment of the last named compound with acetic anhydride in pyridine solution gave 5α-fluoro-17α-ethyl-androstane-3β,17β-diol 3-acetate.

Example XVI

17α-methyl-19-nor-Δ⁵-androstene-3β,17β-diol was submitted to the reactions described in Example I. There was thus obtained 5α-fluoro-17α-methyl-19-nor-androstane-3β,17β-diol and 5α-fluoro-17α-methyl-19-nor-androstan-17β-ol-3-one.

Esterification of the latter compound with the corresponding acid anhydrides in benzene solution and in the presence of p-toluenesulfonic acid gave the acetate, propionate, caproate and cyclopentylpropionate of 5α-fluoro-17α-methyl-19-nor-androstan-17β-ol-3-one.

Example XVII

A solution of 2 g. of 17α-ethinyl-19-nor-Δ⁵-androstene-3β,17β-diol in 100 cc. of carbon tetrachloride was chilled to −60° C. and added to a mixture of 8 g. of hydrogen fluoride and 14 g. of anhydrous tetrahydrofuran previously cooled to −60° C. The mixture was allowed to warm at 0° C. and kept at this temperature for 2 hours more. After the usual isolation technique there was obtained 5α-fluoro-17α-ethinyl-19-nor-androstane-3β,17β-diol.

A mixture of 1 g. of the above compound, 40 cc. of acetic anhydride and 1 g. of p-toluenesulfonic acid was kept at room temperature for 16 hours, poured into water and stirred for 30 minutes to hydrolyze the excess of anhydride, the formed precipitate was then filtered and recrystallized from acetone-hexane, thus producing 5α-fluoro-17α-ethinyl-19-nor-androstane-3β,17β-diol diacetate.

Example XVIII

By following the method of Example I, 4,4,17-trimethyl-Δ⁵-androstene-3β,17β-diol described by H. J. Ringold et al. in J. Org. Chem. 22, 602 (1957), and 4,4,17-trimethyl-Δ⁵-19-nor-androstene-3β,17β-diol described by A. Bowers et al. in J. Am. Chem. Soc., 81, 424 (1959), were converted into 4,4,17α-trimethyl-5α-fluoro-androstan-3β,17β-diol, 4,4,17α-trimethyl-5α-fluoro-androstan-17β-ol-3-one as well as the corresponding 19-nor-analogs.

Example XIX 500 mg. of 4,4,17α-trimethyl-5α-fluoro-androstan-3β,17β-diol were treated with propionic anhydride in pyridine solution to produce 4,4,17α-trimethyl-5α-fluoro-androstan-3β,17β-diol 3-propionate. Upon treatment of this compound with a mixture of acetic acid-acetic anhydride in the presence of p-toluenesulfonic acid, there was produced 4,4,17α-trimethyl-5α-fluoro-androstane-3β,17β-diol 3-propionate 17-acetate.

Example XX

5α-fluoro-17α-methyl-androstan-17β-ol-3-one obtained as described in Example XIII was esterified with acetic, caproic and cyclopentylpropionic anhydrides in benzene solution and in the presence of p-toluenesulfonic acid to produce the corresponding esters.

Example XXI

A solution of 1 g. of 5α-fluoro-17α-ethinyl-androstan-17β-ol-3-one in 25 cc. of pyridine was hydrogenated in the presence of 200 mg. of previously reduced 10% palladium on calcium carbonate. After 1.1 mols of hydrogen had been absorbed, the catalyst was filtered off and the solution poured into water, extracted with methylene chloride and the organic extract washed to neutral, dried over anhydrous sulfate and evaporated to dryness. Crystallization from acetone gave 5α-fluoro-17α-vinyl-androstan-17β-ol-3-one.

Treatment of the latter compound with caproic anhydride in benzene solution and in the presence of p-toluenesulfonic acid gave the corresponding caproate.

I claim:
1. A compound of the following formula:

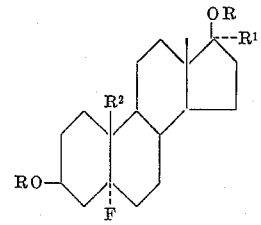

wherein R is selected from the group consisting of hydrogen and a hydrocarbon carboxylic acyl group of less than 12 carbon atoms; $R^1$ is selected from the group consisting of hydrogen and an aliphatic hydrocarbon of less than 8 carbon atoms; and $R^2$ is selected from the group consisting of hydrogen and methyl.

2. A compound of the following formula:

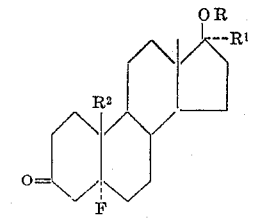

wherein R is selected from the group consisting of hydrogen and a hydrocarbon carboxylic acyl group of less than 12 carbon atoms; $R^1$ is selected from the group consisting of hydrocarbon and an aliphatic hydrocarbon of less than 8 carbon atoms; and $R^2$ is selected from the group consisting of hydrogen and methyl.

3. 5α-fluoro-androstan-17β-ol-3-one.
4. 5α-fluoro-17α-ethinyl-androstan-17β-ol-3-one.
5. A compound of the following formula:

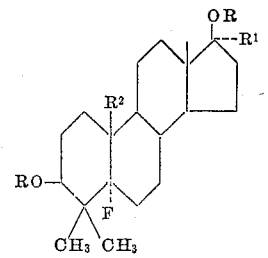

wherein R is selected from the group consisting of hydrogen and a hydrocarbon carboxylic acyl group of less than 12 carbon atoms; $R^1$ is selected from the group consisting of hydrogen and an aliphatic hydrocarbon of less than 8 carbon atoms; and $R^2$ is selected from the group consisting of hydrogen and methyl.

6. A compound of the following formula:

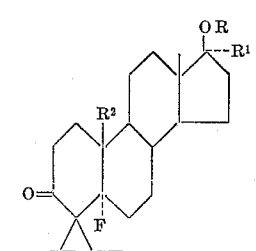

wherein R is selected from the group consisting of hydrogen and a hydrocarbon carboxylic acyl group of less than 12 carbon atoms; $R^1$ is selected from the group consisting of hydrogen and an aliphatic hydrocarbon of less than 8 carbon atoms, and $R^2$ is selected from the group consisting of hydrogen and methyl.

7. A compound of the following formula:

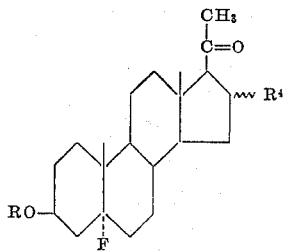

wherein R is selected from the group consisting of hydrogen and a hydrocarbon carboxylic acid group of less than 12 carbon atoms; and $R^4$ is selected from the group consisting of hydrogen, α-methyl and β-methyl.

8. 5α-fluoro-pregnan-3β-ol-20-one.

9. A compound of the following formula:

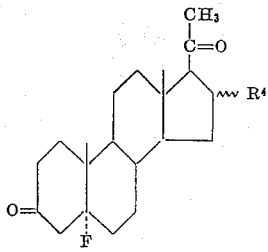

wherein $R^4$ is selected from the group consisting of hydrogen, α-methyl and β-methyl.

10. The process of claim 9 wherein the 3β-hydroxy-5α-fluoro-androstane is oxidized to produce the corresponding 3-keto-5α-fluoro-androstane.

11. The process of claim 9 wherein the 3β-hydroxy-5α-fluoro-pregnane is oxidized to produce the corresponding 3-keto-5α-fluoro-pregnane.

12. 5α-fluoro-pregnane-3,20-dione.

13. 16α-methyl-5α-fluoro-pregnan-3β,17α-diol-20-one.

14. The hydrocarbon carboxylic acid esters of less than 12 carbon atoms of 5α-fluoro-pregnane-3β,17α-diol-20-one.

15. 16α-methyl-5α-fluoro-pregnan-17α-ol-3,20-dione.

16. The hydrocarbon carboxylic acid esters of less than 12 carbon atoms of 5α-fluoro-pregnan-17α-ol-3,20-dione.

17. A compound of the following formula:

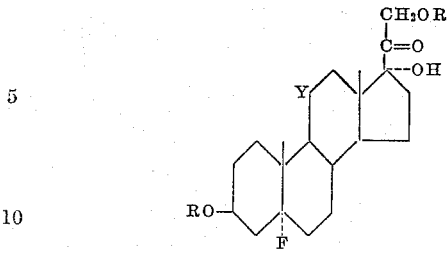

wherein R is selected from the group consisting of hydrogen and a hydrocarbon carboxylic acyl group of less than 12 carbon atoms, and Y is selected from the group consisting of hydrogen, keto, α-hydroxy and β-hydroxy.

18. A compound of the following formula:

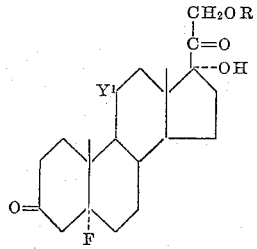

wherein R is selected from the group consisting of hydrogen and a hydrocarbon carboxylic acyl group of less than 12 carbon atoms and $Y^1$ is selected from the group consisting of hydrogen and keto.

19. The 21-hydrocarbon carboxylic acid esters of less than 12 carbon atoms of 5α-fluoro-pregnane-17α,21-diol-3,11,20-trione.

20. A process for producing a 5α-fluoro-androstane comprising reacting a compound selected from the group consisting of a 3β-hydrocarbon carboxylic acyloxy-Δ⁵-androstene and a 3β-hydroxy-Δ⁵-androstene with hydrogen fluoride at about −50° C.

21. A process for producing a 5α-fluoro-pregnane comprising reacting a compound selected from the group consisting of a 3β-hydrocarbon carboxylic acyloxy-Δ⁵-pregnene and a 3β-hydroxy-Δ⁵-pregnene with hydrogen fluoride at about −50° C.

References Cited in the file of this patent

UNITED STATES PATENTS 2,833,790    Chemerda et al. _____ May 6, 1958

UNITED STATES PATENT OFFICE

CERTIFICATE OF CORRECTION

Patent No. 3,071,602

January 1, 1963

Albert Bowers

It is hereby certified that error appears in the above numbered patent requiring correction and that the said Letters Patent should read as corrected below.

Column 9, line 33, for the claim reference numeral "9" read -- 20 --; line 36, for the claim rerence numeral "9" read -- 21 --.

Signed and sealed this 18th day of June 1963.

(SEAL)
Attest:

ERNEST W. SWIDER
Attesting Officer

DAVID L. LADD
Commissioner of Patents